INVENTOR
Joseph E. De Villiers
ATTORNEY

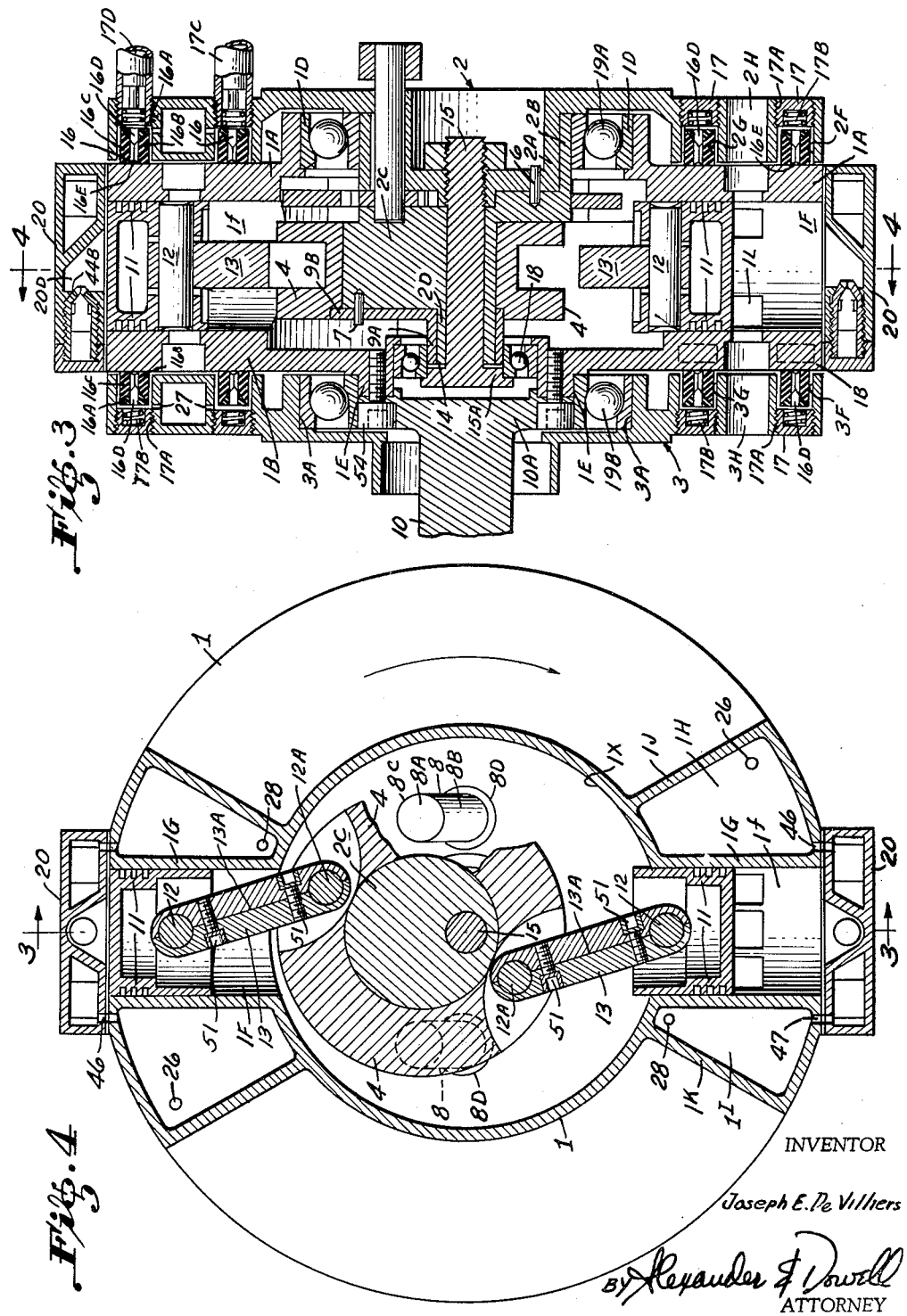

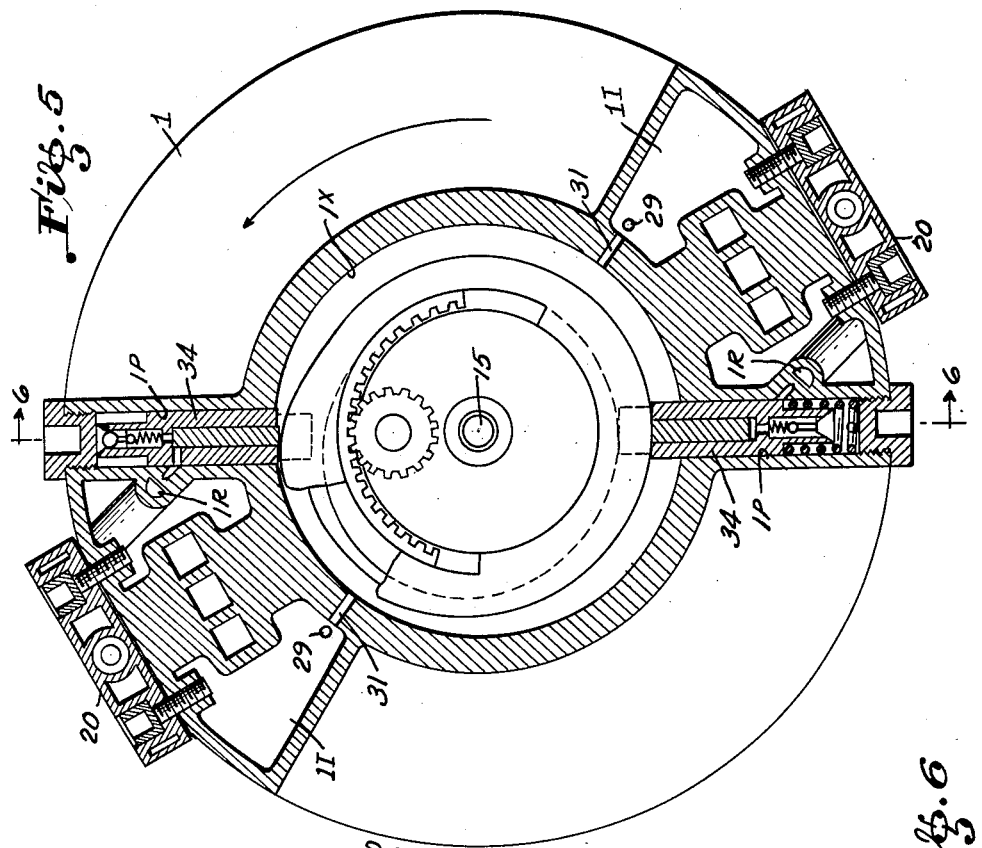
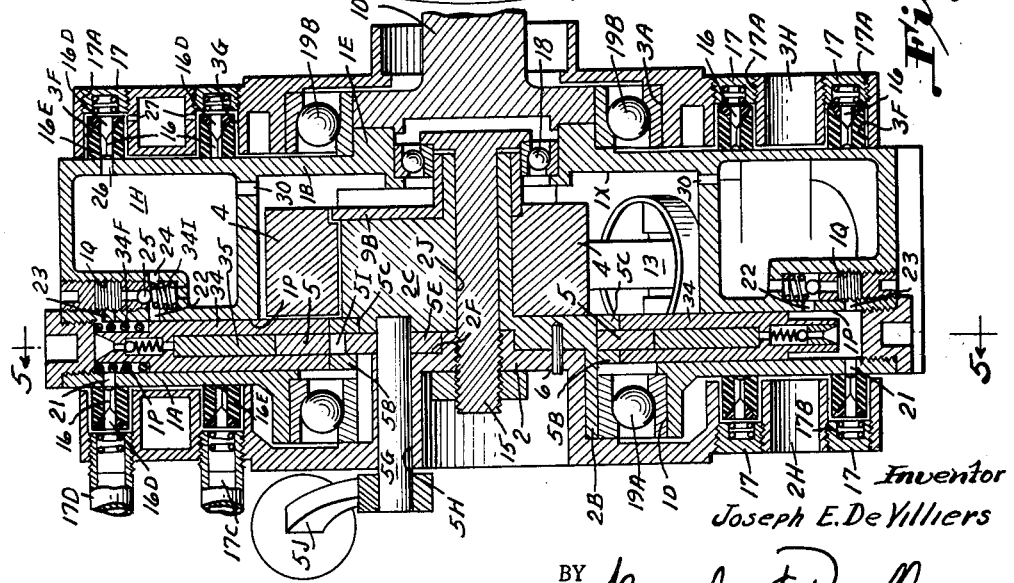

Feb. 2, 1965   J. E. DE VILLIERS   3,168,082
ROTARY ENGINES
Filed Sept. 29, 1960   5 Sheets-Sheet 4

INVENTOR
Joseph E. De Villiers
BY Alexander & Dowell
ATTORNEY

INVENTOR
Joseph E. De Villiers

BY
ATTORNEY

United States Patent Office 3,168,082
Patented Feb. 2, 1965

3,168,082
ROTARY ENGINES
Joseph E. De Villiers, 420 Le Boeuf St.,
New Orleans 14, La.
Filed Sept. 29, 1960, Ser. No. 59,369
21 Claims. (Cl. 123—44)

My invention relates to expansion engines either of the internal combustion type burning gasoline, crude oil, diesel oil or furnace oil, etc., or of the heat expansion type, for instance steam engines. The present novel structure may also without injector be used as a steam or hydraulic motor or pump.

It is a principal object of this invention to provide an improved expansion engine which operates on a two-cycle sequence, or the equivalent thereof and which provides a very high efficiency, especially providing high output horsepower with relatively small engine weight and with a very greatly reduced number of parts as compared with prior art piston engines.

It is another major object of my invention to provide a piston engine in which pistons reciprocate in a rotary engine block which rotates around a stationary shaft but is coupled with an output shaft through a novel system of linkages including a main journal rotatably supported on the shaft and coupled by connecting rods with the pistons in an improved manner.

It is still another object of my invention to provide an engine of the type described wherein said journal is coupled by means of a free floating system of connecting rods with the piston in the rotary block and in which the stationary shaft is eccentric with respect to the axis of rotation of the rotary cylinder block, the connecting rods by virtue of this eccentricity having their inner ends located off-center with respect to the axis of rotation of the cylinder block, whereby a very material difference in piston speed is created so that the speed of the piston stroke when approaching top dead center is faster than the speed of the piston stroke when approaching bottom dead center. In this manner, a rapid compression stroke is provided at the beginning of each cycle, and a longer and slower power stroke is provided during expansion of the fuel because of the offset center of the circle traveled by the wristpins which connect the connecting rods to the journal, which circle of travel is larger than the eccentricity of the crankpin on which the journal rotates, the eccentricity and the offset of the wristpins being measured in comparison with the center of rotation of the rotary cylinder block of the engine.

Still another object of my invention is to provide an engine especially well adapted to fuel injection principles, and to provide a novel and improved throttle system for controlling the amount of fuel injected in the cylinders during operation of the engine.

Another very important object of this invention is to provide a rotary-block engine employing novel and improved sealing means between the rotary block and the stationary engine frame which supports the crankpin on which the block rotates, the fuel and coolant and lubricant being communicated with the rotary engine block through the present novel seals which are especially designed to take up expansion and contraction of the parts and maintain a perfect low-friction seal at all times.

Still another important object of the present invention is to provide a rotary block structure which cooperates with a stationary frame comprising opposed end plates to provide a porting action permitting the intake and exhaust cycles of the engine to occur during a greater portion of the angular rotation of the engine so as to provide optimum scavenging of the cylinders despite the fact that the engine is basically a two-cycle engine.

It is another object of this invention to provide an improved engine cycle in which a fresh blast of air is forced through the cylinders during scavenging thereof and prior to fuel intake, the air being supplied under compression from an external blower, which blower is not entirely necessary to the operation of the ingine, although it does increase its efficiency very materially.

Still another important object of my invention is to provide an engine which runs on oil, which oil not only serves as the fuel employed to run the engine, but also serves as a coolant and a lubricant which is circulated through the block and the crankcase and then returned to a location outside of the engine where it can be cooled prior to being entered into the engine again. In this type of operation, part of the fuel entering the engine is recirculated as a coolant, and the rest of the fuel entering the engine is actually burned to produce the power to operate the engine. This engine may also be air cooled.

Other objects and advantages of my invention will become apparent during the following discussion of the drawings, wherein:

FIG. 3 is a section view taken through the engine along line 3—3 of FIG. 4;

FIG. 4 is a section view taken along line 4—4 of FIG. 3;

FIG. 5 is a section view taken along line 5—5 of FIG. 6;

FIG. 6 is a section view taken along line 6—6 of FIG. 5;

Figure 2:
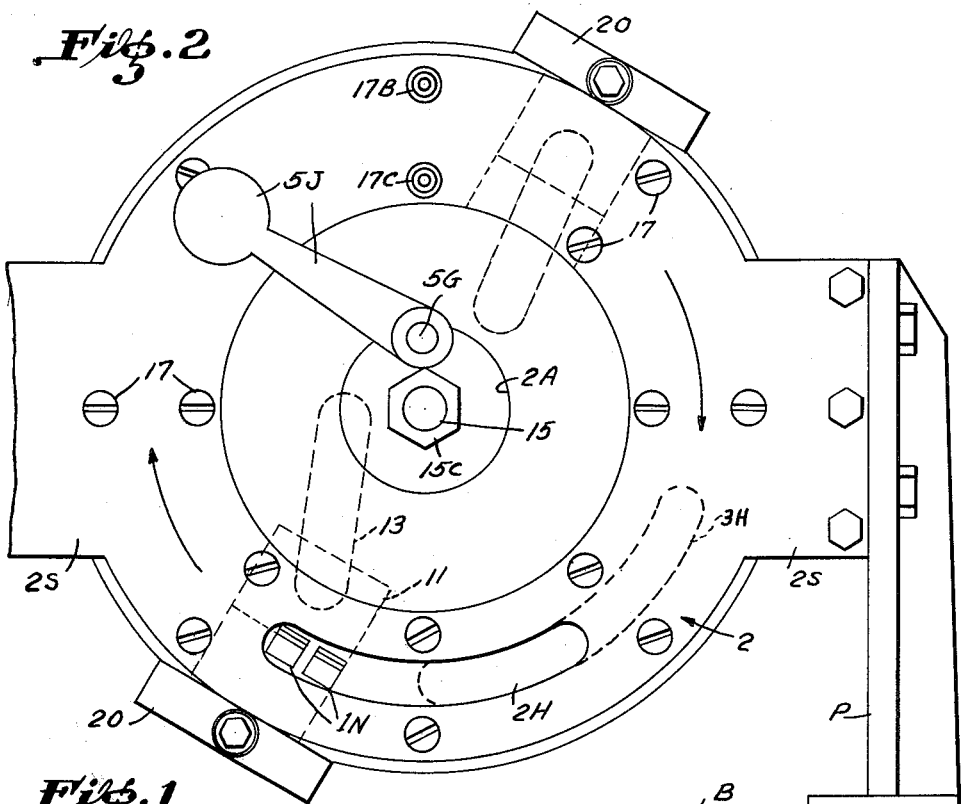
FIG. 2 is an elevation view of one end of the engine according to the present invention.
Figure 1:
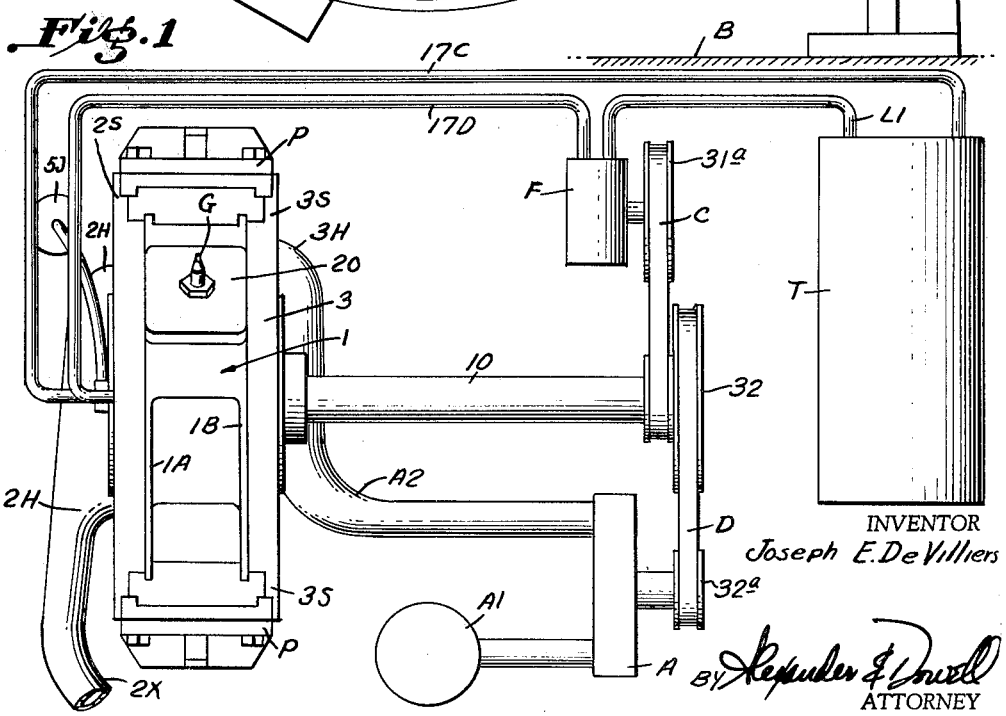
FIG. 1 is an elevation view showing an engine according to the present invention connected with a fuel tank, a fuel pump, and forced air means.

Referring now to the various figures of the drawings, and in particular to FIG. 1, an injection type engine is illustrated, this engine being intended to burn oil injected into the cylinders through spray nozzles located therein. In order to clearly illustrate the principles of this invention, the present illustration shows a two-cylinder engine, although it will be understood that a greater number of cylinders can be employed as desired without changing the basic principles of operation. The engine illustrated in FIGS. 1 and 2 includes a substantial housing within which the rotary block is journaled and this housing is provided with a base of any suitable type generally referred to by the reference character B in FIG. 2. This base includes a pair of supporting plates P of which only one is illustrated in FIG. 2, these supporting plates P being located on either side of the main engine housing, which housing has extensions 2S on one side and 3S on the other side, the extension 2S forming part of the main crankplate 2, and extensions 3S forming part of the main shellplate 3, which plates secure the entire engine together as a unit when bolted together in any satisfactory manner. The rotary block 1 containing the cylinders is located between the crankplate 2 and the shellplate 3 and is supported for rotation about an eccentrically located stationary engine shaft 2C which is supported near shoulder 2A and held by bolt 15 which passes through the block and the crankplate 2 and shellplate 3. This structure will be more fully described hereinafter.

FIG. 1 illustrates the main drive shaft 10 extending through the shellplate 3 outwardly of the engine and supporting at its outer end a series of sheaves 31 and 32 which drive through coupling belts C and D the sheave 31a on a fuel pump F and the sheave 32a on an air blower A which are appropriately coupled with the engine. A fuel pump takes fuel through the line L1 and pumps it under pressure through the line 17D into the intake of the engine. A return line 17C returns part of the fuel to the fuel tank T which also represents a large cooling capacity heatsink through which the heat from the engine can be dissipated, said heat being conducted to the tank T via the fuel line 17C.

The air blower A includes an air filter A1 and a pipe A2 by which air under compression is supplied to the air intake 3H of the engine, this air intake being more fully described hereinafter. The discharge in the form of exhaust from the engine passes outwardly through exhaust ports 2H which are generally indicated in FIG. 1 as connected with an exhaust pipe 2X.

A throttle handle 5J is also provided outside of the engine as illustrated in FIG. 1 to control the power developed therein, and one of the cylinder heads 20 is also visible in FIG. 1, the cylinder heads 20 each supporting a spark plug G in the case where the engine is intended to burn gasoline ignited by an electrical spark. The rest of the ignition system is not shown but would be of conventional design. In the case of an oil burning engine, the spark plug would be replaced by a glow plug. All of these structural parts and their mutual co-operation will be more fully described hereinafter in connection with a detailed description of the engine.

Referring now to FIGS. 3, 4, 5 and 6, these figures show cross sections through various portions of the engine minus the end supporting plates P, the reference numeral 1 referring generally to the rotary cylinder block and the letters following the numeral 1 designating particular parts thereof. In this rotary cylinder block any desired number of cylinders 1F can be arranged along radial axes all of which pass through the axis of rotation of the cylinder block which corresponds with the axis of the stationary shaft 2B, the bolt 15 and the main output shaft 10, all of these parts being visible in FIGS. 3 and 6. The cylinders 1F can either be formed integrally by boring the rotary block 1, or can be assembled therein in any suitable amnner, just so long as the axes of the cylinders all pass through the center of rotation of the cylinder block 1 as it rotates around the stationary shaft 2B. The rotary block has a large central bore therein bearing the reference numeral 1X in FIGS. 4 and 6, and further includes a plurality of jackets 1H and 1I which are formed next to the cylinders and serve to conduct cooling liquid therepast in a manner to be more fully explained in connection with the subsequent exposition of the flow of the fuel through the engine. The rotary block 1 includes two walls 1A and 1B which are best illustrated in FIGS. 3 and 6 and the cylinders are located between these walls, being either solid castings such as illustrated in the drawing or fabricated, depending upon manufacturing procedure which is most economical in view of the total number of cylinders employed. The drawings show an open space between the cylinders, as can best be seen in FIG. 1, although this space could also be closed if desired to reduce windage. In the wall 1A are a series of exhaust ports 1N, and in the wall 1B are a series of intake ports 1L, and these ports communicate with the cylinders 1F.

As can be seen in FIG. 4, the jackets adjacent to the cylinders share common walls 1G which are located opposite walls 1J and 1K of the various jackets. As will be further discussed below, these jackets 1H and 1I serve the purpose of cooling the engine and also serve as jackets through which the fuel passes on its way either to be burned in a cylinder to be passed into the crankcase of the engine for the purpose of lubrication of the parts therein, or to be returned to the tank for the purpose of dissipating its heat therein. As can be seen in FIGS. 5 and 6, the block also includes injector chambers 1P and bleeding chambers 1Q which will likewise be discussed hereinafter in connection with a more detailed discussion of the flow of fuel through the engine. A passageway comprising a check valve chamber 1R joins the chambers 1P and 1Q.

The rotary cylinder block 1 is rotatably mounted on bearings which are supported on flanges extending axially from the walls 1A and 1B and respectively labeled 1D and 1E, these flanges being clearly visible in FIGS. 3 and 6. The outer race of the ball bearing 19A is mounted on the inner periphery of the flange 1D and the inner race of the ball bearing 19B is mounted on the outer periphery of the flange 1E. These ball bearings 19A and 19B are respectively supported on the outer periphery of the shaft 2B and on the inner periphery of a bore 3A within the shellplate 3. These bearings 19A and 19B comprise the main bearings supporting the rotary cylinder block between the two plates 2 and 3 of the engine, and there is also provided an additional stabilizing bearing 18 which has its outer race supported in a bore in the plate 1B of the rotary cylinder block, and has its inner race supported on the hub of a spacer 9B which is mounted on an extension 2D supported by the bolt 15 which holds the engine together and in turn supports the eccentric crankpin 2C which is clearly illustrated in FIGS. 3, 4 and 6. A connecting rod journal generally referred to by the reference numeral 4 rotates on the eccentric crankpin 2C about a center which is offset from the center of rotation of the rotary cylinder block 1, which latter center also corresponds with the axis of the bolt 15. All of the pistons 11 are coupled to the connecting rod journal 4 by connecting rods 13 which are secured to the pistons 11 by wristpins 12 and are secured to the connecting rod journal 4 by wristpins 12A. The connecting rods 13 are split as at 13A from one wristpin bore to the other and are held together by screws 51 which secure the connecting rods 13 to these wristpins in a manner well known per se.

Figure 7:
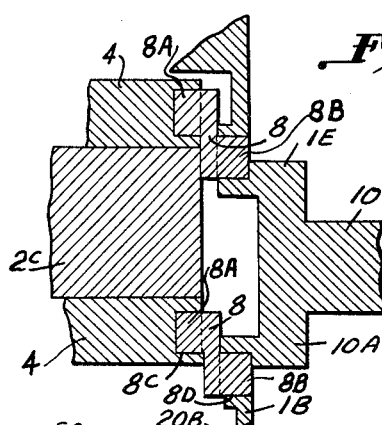
FIG. 7 is a fragmentary section view on an enlarged scale illustrating the coupling means connecting the connecting rod journal with the rotary engine block.

In order to transfer power from the pistons 11 to the main engine output shaft 10 which is coupled by means of screws 54 to the plate 1B of the rotary cylinder block 1, it is necessary that the connecting rods 13 be offset from the center of rotation of the rotary cylinder block. In order to maintain a proper offset at all times, the connecting rod journal 4 is advanced somewhat ahead of the position of the rotary cylinder block 1 and is maintained in proper advanced position by means of a plurality of link couplings 8 which are made in the form of an offset crank having one end 8A rotatably secured in the connecting rod journal 4 and having the other end 8B rotatably connected to the plate 1B of the rotary cylinder block 1, so as to permit relative motion between the journal 4 and the block 1 while at the same time causing them to rotate together. It is this offset by which the power is transmitted from the pistons 11 to the shaft 10 and this offset is analagous to the offset of the crankshaft of eccentric bearings in the ordinary reciprocating piston engine. The structure of the link couplings 8 and the manner of their engagement with the other parts of the engine is particularly well illustrated in FIG. 7. As the rotary cylinder block 1 rotates about the axis of the drive shaft 10 and the connecting rod journal 4 rotates about the eccentric crankpin 2C, the link couplings 8 describe a circle while at the same time rotating as they travel around that circle. Two of these link couplings 8 are illustrated in the figures, but any number can be used, four being considered a desirable number in the two-cylinder engine illustrated in the present embodiment. As these link couplings 8 rotate while at the same time traveling through an orbit concentric with the crankpin 2C, the amount by which the connecting rod journal 4 is advanced to offset the connecting rods from the center of rotation of the engine will be varied so that in one position of the engine the connecting rods will be advanced considerably, whereas in another position of the engine the advance of the connecting rods will be very much decreased. However, the force of expansion of the fuel against the piston 11 is always transferred through the connecting rods 13 in directions which are offset from the center of rotation of the rotary cylinder block 1 at all times, the offset being in the direction in which the engine is rotating.

FIGS. 8, 9, 10 and 11 are a series of figures showing the rotation of the engine through 90° for the sake of showing the motion performed by the connecting rod journal 4, the link couplings 8, the pistons 11 and the connecting rods 13. These four figures illustrate the manner in which the amount of advance of the connecting rods varies as the engine rotates and these figures further serve to illustrate that there is a very desirable pause in the motion of the pistons 11 in the cylinders 1F both at top dead center and at bottom dead center. Moreover, these figures illustrate the manner in which the piston travels at a greater speed when approaching top dead center than when performing the power stroke from top dead center toward bottom dead center even though the shaft rotation rate remains constant. These features will be discussed in greater detail further on in the specification.

Referring now to FIGS. 3 and 4, the crankplate 2 includes a recessed portion 2A which mates with a portion of the crankpin 2B and is prevented from rotation with respect thereto by a dowel pin 6. The inner race of the bearing 19A is mounted on the outer periphery of the crankpin 2B and supports the right end of the rotary cylinder block 1 which engages the bearing at the shoulder 1D. As stated above, on the opposite or left end of the rotary cylinder block 1 there is a supporting bearing 19B the outer race of which is supported in a bore 3A in the shellplate 3 and the inner race of which is supported on a shoulder 1E of the rotary cylinder block. A stabilizing bearing 18 serves to maintain the shaft 2C in proper alignment with the axis of the bolt 15 and is mounted in a bore in the rotary cylinder block adjacent the junction of the shaft 10 therewith. The inner race of the stabilizing bearing 18 is mounted on an extension 9A of a member including a flange 9B which is secured to the eccentric crankpin 2C by a dowel pin 7 to prevent relative rotation with respect thereto. A plurality of shims 14 are placed under the head of the bolt 15 which is then pulled in 2E up tight to secure the members 2A, 2B, 2C, 9B, 9A and 14 together. The main drive shaft coming from the engine is secured to the rotary cylinder block at a flange 10A, the coupling to the portion 1E of the cylinder block 1 being accomplished by bolts 54.

Figure 12:
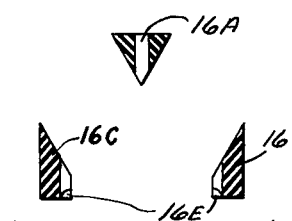
FIGS. 12 and 13 are enlarged detail views illustrating the structure of the rotary seal between the stationary and rotary members of the engine.
Figure 13:
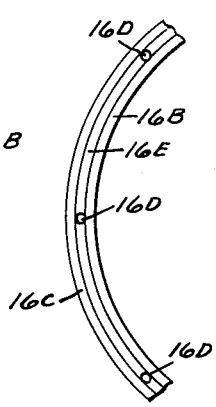

Considering again the two plates 2 and 3 which are supported on their extensions 2S and 3S by the mounting plates P, FIG. 2, each of these end plates houses two sealing rings, one being of larger diameter than the other and the sealing rings being all designated by the reference numeral 16. These sealing rings bear against the outer walls 1A and 1B of the rotary cylinder block 1 and the seals themselves are supported in annular grooves 2G and 2F of the crankplate 2, and 3G and 3F of the crankplate 3, see FIG. 3. Each of the seals 16 comprises three parts, including a V-shaped central part 16A and two wedge-shaped members 16B and 16C, respectively, see FIGS. 12 and 13. These seals are made of a wear-resistant material and are so arranged in the grooves, as shown in FIGS. 3 and 12, that the V-shaped central portion of the seal 16A presses the portions 16B and 16C against the surface of the rotary cylinder block 1 and at the same time spreads the members 16B and 16C until they make snug sealing contact with the walls of the respective annular grooves 2G, 2F, 3G and 3F.

Each of the seals has a series of bores 16D through which the fuel oil passes from the stationary inlet pipes 17D and 17C to the rotary cylinder block 1, the circulation of the fuel being discussed hereinafter. The fuel oil also lubricates the contact of the seals with the rotary cylinder block and thereby prevents wear therebetween. The composite of the two seal portions 16C and 16B also forms a circular recess 16E in which the fuel oil is trapped so that it is evenly distributed around the periphery of each seal so that it can communicate easily with the various inlet or outlet openings in the rotary cylinder block which openings all lie one under the other of the sealing rings and will be more fully discussed hereinafter.

As can be seen in FIGS. 2 and 3 the crankplate 2 which includes the circumferential-receiving grooves 2F and 2G is provided with a series of threaded bores 17A which receive a plurality of threaded caps 17 each of which houses a spring 17B serving to apply pressure against the ring seals 16 to maintain them in tight contact with the rotary cylinder block walls 1A and 1B. A plurality of these caps overlie each of the rings and form two annular series, for instance as shown in FIG. 2. The structure on the shellplate 3 is the same, and includes a plurality of threaded bores 17A each of which receives a spring 17B held in compression against a ring seal 16 by a cap 17. In this structure, the fuel passes through the passages 16D which are spaced around the periphery of the ring seals 16 as can best be seen in FIG. 13, the fuel also being free to flow in the annular recess 16E in each of the seals so as to maintain an oil film all the way around each seal and avoid any wear between the face of the seal and the adjacent face of the rotary cylinder block 1. The ring seals also are used to maintain the oil in the crankcase of the engine in the vicinity of the connecting rod journal 4 and the eccentric crankpin 2C. The fuel circle will be discussed in greater detail hereinafter.

The air intake and exhaust ports of the engine are not valve-controlled but are controlled by the rotary position of the block 1 with respect to the shellplate 3 and the crankplate 2 which plates have openings therein, for instance as shown at 2H in FIG. 2, the opening 2H being an exhaust port. These openings can be seen at the bottom of FIG. 3 which shows the lower piston 11 substantially on bottom dead center and shows the exhaust port 1N aligned with the exhaust port 2H in the crankplate 2, the exhaust port 2H being coupled with the exhaust pipe 2X, illustrated in FIG. 1. The intake port 3H passes through the shellplate 3 and is coupled with the inlet pipe A2 from the air blower A. The inlet port 3H is aligned with the intake port 1L through the rotary block 1, and it will be observed in the lower half of FIG. 3 that there is a straight-through passage extending from the inlet port 3H through the ports 1L, the cylinder 1F, the exhaust opening 1N and the exhaust port 2H, so that air forced from the cylinder by the blower A completely scavenges the cylinder when the piston is substantially on bottom dead center. The arcuate etxent of the ports 2H and 3H is substantially 100° for 2H and 90° for 3H so that a very adequate amount of scavenging is accomplished in each cylinder 1F during every revolution of the block 1.

It is also to be noted that the inlet port 3H and the exhaust port 2H are located between the inner and outer sealing rings 16 on each side of the block. Actually, it is not necessary that two sealing rings be employed on each side of the engine block 1 because of the fact that a single sealing ring could be used for both intake and return lines of the fuel and also in view of the fact that the inlet and exhaust openings 3H and 2H can be substantially annular around the end plates if desired. The two ports 1L and 1N would be open substantially 120° through the end plates 2 and 3.

The exhaust ports 1N and 2H are opened approximately 50° before bottom dead center and also 50° therepast. This arcuate opening 2H therefore corresponds substantially with the arc of rotation during which the piston 11 is located below the ports 1L and 1N in the cylinder so that gases can be exhausted and new air taken in. Although the exhaust port is open from 50° before bottom dead center to 50° after bottom dead center, the intake port which is connected with the air blower A does not open until the piston has substantially arrived at the bottom dead center position so that the exhaust ports open first and then the air inlet port opens subsequently so that the blower can force air to pass through the cylinder after sufficient pressure of the exhaust gases has been released through the exhaust manifold 2X. The blower A, of course, greatly improves the scavenging of the cylinders 20° from the bottom dead center position in which the intake port 3H becomes aligned with the inlet ports 1L to a position 70° past bottom dead center in which position the piston 11 rises to cover the ports 1L and 1N which ports then pass out of mutual alignment with the corresponding inlet and exhaust ports 2H first and then 3H in the end plates of the engine.

Figure 8:
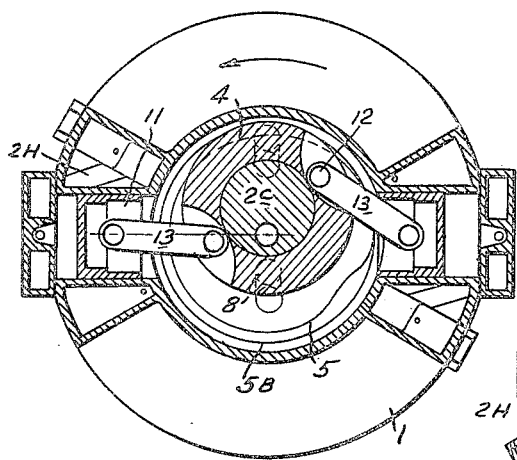
FIGS. 8, 9, 10 and 11 are section views on a reduced scale showing the engine in various successive positions.
Figure 9:
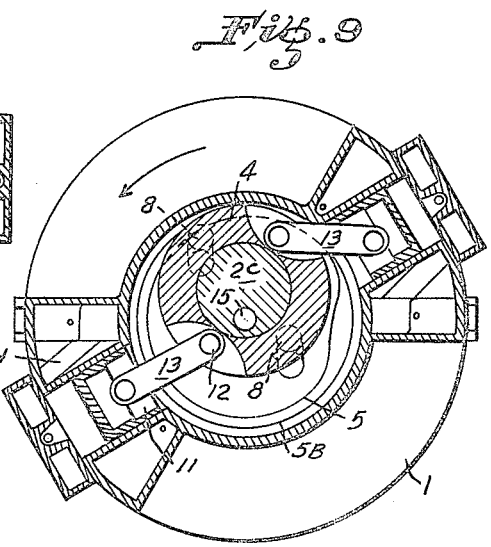
Figure 10:
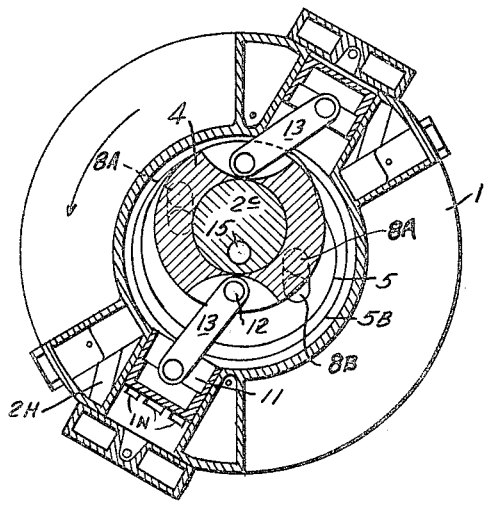
Figure 11:
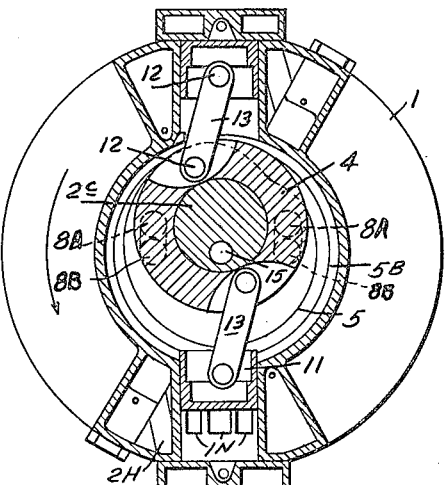

Referring to FIGS. 8, 9, 10 and 11, it is important to note the fact that the pistons travel at different rates of speed depending on whether they are approaching top dead center or receding from top dead center. The pistons are in top dead center when they are in the position shown at the top of FIG. 11 and in bottom dead center when they are in the position shown at the bottom of FIG. 11. On the other hand, the pistons are performing their maximum rate of travel in the two positions shown on the two sides of FIG. 8, the piston on the right side approaching top dead center and the piston on the left side approaching bottom dead center, as indicated by the two arrows which show the direction of rotation of the block. In FIG. 8, it will be noted that the connecting rod which is coupled with the left piston has its axis substantially aligned with the axis of the bolt 15, but on the other hand the connecting rod 13 coupled with the piston located on the right side of the drawing is very much offset from the axis of the bolt 15, which by the way is the axis of rotation of the cylinder block 1. By the time the left cylinder has reached the rightmost position and the right cylinder has reached the leftmost position, after 180° of rotation of the engine block, the offset of the connecting rods will have reversed. Thus, the rate of travel of the piston 11 on the right side of FIG. 8 will be considerably faster than the rate of travel of the piston on the left side. The piston on the left side of FIG. 8 is performing a compression cycle, whereas the piston on the left side of FIG. 8 is performing a power stroke at a slower rate. FIG. 9 shows the relative position of the parts after another 30° of rotation of the block 1, illustrating the change in the position of the coupling members 8 with respect to the connecting rod journal 4 and the beginning of the change in the angle between the connecting rods 13 and the axis of the bolt 15. In FIG. 9, the leftmost piston 11 is performing a power stroke, and the rightmost piston 11 is performing a compression stroke. In FIG. 10, which shows the position of the parts 30° past the position shown in FIG. 9, the upper piston 11 is approaching top dead center on its compression cycle, and the lower piston 11 has just moved sufficiently to uncover the exhaust ports 1N which have come into alignment with the beginning of the exhaust port 2H so that the lower cylinder 1F has arrived at the beginning of its exhaust cycle. In FIG. 11, the upper piston 11 is in top dead center and the lower piston 11 is in bottom dead center and has now become aligned with the air inlet port 3H so that the lower cylinder 1F is being scavenged by the air blower A. From the position shown in FIG. 11, the rotary cylinder block 1 continues to advance until the lower cylinder passes out of alignment with the inlet and exhaust ports 3H and 2H to begin its compression cycle. On the other hand, the upper cylinder fires substantially in the position shown in FIG. 11 and begins its power stroke which takes place over the next 130° of block rotation.

*Circulation of Fuel-Coolant*

By reference to FIG. 1 and FIG. 3 it will be seen that the fuel is pumped from the fuel pump F through the inlet line 17B which enters the outermost seal 16 in the crankplate 2 and this fuel circulates through the engine and some of it is used as a fuel, whereas the rest of the fuel is circulated as a coolant and a lubricant and is discharged from the inside seal 16 in the crankplate 2 and is returned through the line 17C, FIG. 1, to the fuel tank T which also serves as a heatsink. If desired, of course, a heat exchanger or radiator can be used in series with the line 17C. By reference to FIG. 6 it will be seen that the fuel which enters the line 17B passes through the bore 16D of the outer seal 16 and into the annular groove 16E. From this annular groove 16E the fuel passes through one of a series of bores 21 in the rotary cylinder block 1 and into the rotary cylinder block into a chamber 34F which is also clearly visible in FIG. 14. The pressure within the chamber 34F is substantially constant since it is applied continuously by the fuel pump F. The fuel therefore passes through another passageway 22, FIG. 6, into a bleeding chamber 34I. From the bleeding chamber 34I the fuel passes into the jacket 1H of the rotary cylinder block 1 and from this jacket the fuel passes in two different directions as follows: The fuel can pass from the jacket 1H which can be seen in both FIGS. 4 and 6 through a bore 30 into the crankcase 1X of the engine for the purpose of lubricating the moving parts therein, the fuel when used as a lubricant being returned through a series of openings 31 which can be seen in FIG. 5 and which enter a second set of jackets which are visible in FIGS. 4 and 5. The jackets 1I have exit openings 29 which can be seen in FIG. 5 and these openings are aligned with the groove 16E in the inner seal 16, FIG. 6, and the oil entering the opening 31 passes out through the duct 29, the annular groove 16E of the inner ring and thence through the fuel return line 17C toward the fuel tank T.

Alternatively, the fuel acting as a coolant can pass outwardly through the openings 26 in the jackets 1H, FIGS. 4 and 6, into the circumferential recess 16E of the sealing ring 16 located in the annular groove 3F of the shellplate 3, the fuel entering the annular groove 3F passing through a pair of openings 27 in the shellplate 3 and into the inner groove 3G of the shellplate and thence back through the bore 16D of the inner seal, upper righthand corner of FIG. 6, and thence into the passages 28 which can be seen in FIG. 4 which enter into the other jacket 1I located on the opposite side of the cylinder 1F from the first mentioned jacket 1H. Thus, it will be seen that the fuel oil is circulated on both sides of the cylinder 1F. The fuel thus circulated into the jacket 1I passes outwardly therefrom through the opening 29, FIG. 5, and outwardly through the slot 16 and the fuel return tank 17C as described above. Thus, the two oil seals 16 carried by the shellplate 3 on the right side of FIG. 6 serve to seal the crankcase 1X of the engine and also permit the flow of oil from the outermost ducts 26 to the innermost ducts 28 so that the fuel which is used as a coolant can be recirculated as a coolant, and the portion of the fuel which is used as a crankcase lubricant is circulated through the inlet ducts 30 into the crankcase and through the discharge ducts 31 so that the crankcase lubricant is also circulated externally of the engine to the fuel tank T on a continuous basis so that it can also be cooled.

Figure 14:
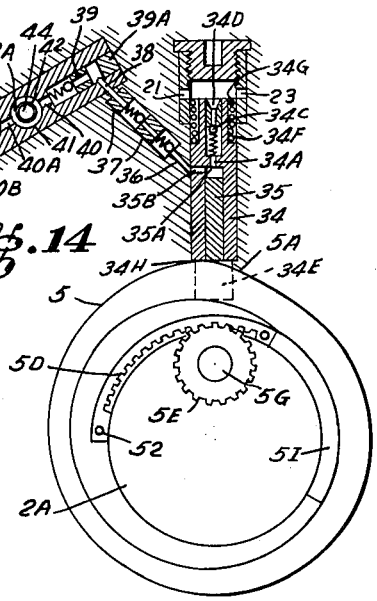
FIGS. 14 and 15 are fragmentary detail views on an enlarged scale illustrating the flow of fuel through the pumping and injection systems of the engine.

The remaining function of the engine is to circulate the fuel for the purpose of combustion, and this function can best be seen by reference to FIG. 14.

Returning now to the chamber 34F illustrated in FIGS. 6 and 14, this chamber contains fuel under the pressure of the fuel pump which fuel is also transferred through the duct 22 into the bleeding chamber 34I. Both of these chambers remain full of fuel at all times. The fuel which is to be burned for the purpose of supplying energy to the engine is entered into the cylinder at the proper moment by a fuel injector associated with each of the cylinders. As the engine rotates around the crankpin 2C, two variable pistons 34 rotate around a cam ring 5, which ring stands substantially stationary during rotation of the engine, but can be annularly positioned by rotation of the throttle shaft 5G for the purpose hereinafter discussed.

The variable piston 34 has a key slot 34H which fits over the cam ring 5 and rides thereon so that the position of the piston 34 is controlled by the position of the rotary engine block 1 with respect to the cam ring 5. The key slot 34H merely overlies the cam ring 5 to prevent rotation of the piston 34 with respect thereto. The piston 34 has a passage 35B which is located to communicate with another passage 36 which communicates with the variable chamber 34F. The variable piston 34 also houses and carries the injector plunger 35 which is operated by the cam lobe 5A. This cam lobe passes through the slot 34H in the variable piston 34 as the piston rotates around the stationary ring 5. The bottom of the piston 34 carries two extensions 34E which ride on second cam surfaces 5B and 5C. The cam 5 stands still at all times, but the second cams 5B and 5C are connected together by a gear segment 5D which meshes with a gear 5E attached to the throttle shaft 5G which in turn carries an external throttle handle 5J so that when the handle is rocked the gear 5E rotates, causing the arcuate gear 5D to move annularly and position the second cams 5B and 5C, thereby changing the position of the piston 34 in the bore 1P. The annular gear 5D is rotated by the pinion gear 5E when the throttle position is changed, and the gear 5D travels in the space 5I which is located between the variable cams 5B and 5C. When the variable cams 5B and 5C are moved in the direction opposite to that in which the engine block is rotating, the throttle is advanced, and when the cams 5B and 5C are rotated by the pinion 5E in the direction in which the engine is rotating, the throttle is retarded. This action will be better understood by reference to the fact that the amount of fuel which is sent through the passageway 36 from the opening 35B is determined by the amount of fuel which is entered into the space 35A between the plunger 35 and the inner bore of the piston 34. The size of this chamber marked 35A in FIG. 14 is determined by the relative positions of the cams 5B and 5C which determines the height of the piston 34 in the bore 1P and also determines the relative positions of the piston 34 and the injector plunger 35.

Figure 15:

FIG. 15 shows various throttle settings which indicate that when the cams are rotated to the uppermost position shown in the drawing the chamber 35A is very small so that only a small amount of fuel can enter this chamber before being injected by the plunger 35 into the bore 36 which eventually leads to the cylinder itself. The middle drawing shows an intermediate position of the throttle, whereas the lowermost drawing in FIG. 15 illustrates full throttle, in which position the chamber 35A is quite large so that a maximum amount of fuel can be entered into this chamber for injection into the engine cylinder when the plunger 35 is forced upwardly by the cam lobe 5A. The chambers 35A thereby comprise fuel calibrating chambers the size of which is varied by rotation of the throttle arm 5J but vary the position of the pistons 34 in the bore 1P. During rotation of the engine, the variable piston 34 is moved upwardly during each revolution of the block and in so doing forces fuel into the funnel-shaped passage 34D, and downwardly past the check valve 34C and into the passage 34A in the calibrating chamber 35A. Once the fuel has been drawn into the calibrating chamber 35A the engine rotation continues until the cam lobe 5A pushes the injector plunger 35 upwardly thereby driving the fuel from the calibrating chamber 35A through the passage 36 and past two check valves 37 located therein and into the cylinder head 20 by way of an inlet duct 38. Note also that the piston 34 is forced upwardly against the action of the spring 34G and that this action drives the excess fuel in the chamber 34F through the two passageways 22 and 23 and through the check valve 25 into the chamber 34I, from which chamber the fuel passes through the openings 24 into the jacket 1H of chamber 34I where it is distributed as incoming fuel either to the cooling jackets 1H and 1I or to lubricate the crankcase 1.

When the injection plunger 35 reaches the end of its stroke, the calibrating chamber 35A has been reduced to substantially zero volume and the fuel passes through the passage 36 and on through the check valves 37 in the bore 1R of the rotary cylinder block 1. This bore is also visible in FIG. 5.

Figure 16:
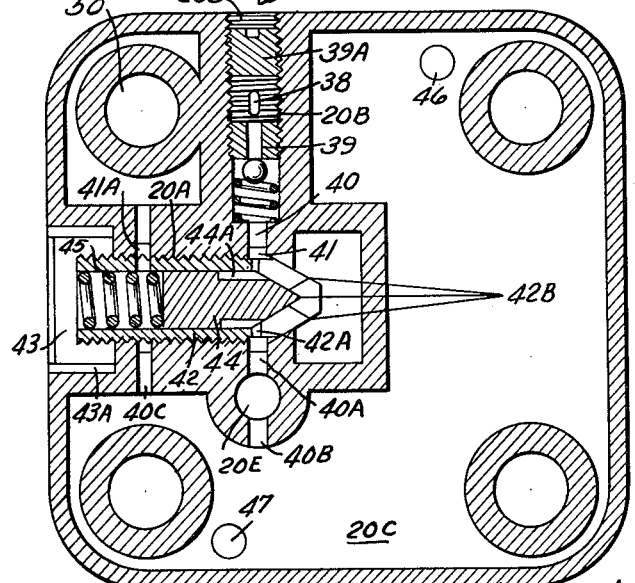
FIG. 16 is a detail sectional view taken through one of the cylinder heads.

The fuel then passes into the head 20 at passage 38 and passes through a chamber 20B, through check valve 39, and into a passage 40 which leads into a circular recess 41 in the spray nozzle bore 20A, FIG. 16. The fuel then passes through two passages 42A and into the spray nozzle body 42, and into the plunger valve chamber 44A thereof. This chamber is provided with a bleeder in which any existing air is passed from the chamber 44A into a circular recess 41, through passage 40A and then to a bleeding valve 20E which can be opened when necessary to bleed the air from the head. The fuel will pass from the passage 40D into the head jacket 20C. This bleeding process is used only when placing the engine into service after it has been knocked down. Otherwise the bleeding valve 20E remains closed and the fuel is forced to open the plunger valve 44 of the nozzle which lifts from the seat 44B in the spray nozzle body 42. This lift allows the fuel to pass from the spray nozzle passage 42B into the main mixing chamber 20D of the cylinder 1F wherein the fuel is ignited and expands to force the piston 11 inwardly of the engine.

I do not limit my invention to the exact form shown in the drawings, for obviously changes may be made therein within the scope of the following claims.

I claim:

1. An engine or pump assembly comprising a stationary frame including opposed plates; a rotary block disposed for rotation about its axis between said plates, said block having a central annular cavity defining the crankcase of the assembly and having at least one cylinder bore in the block disposed radially of said axis; bearing means for supporting the block on the plates for rotation about said axis; a main shaft coupled with said block; an eccentric crankpin in said crankcase and supported by said plates offset from said axis of the block; a piston in each cylinder bore; a connecting-rod journal rotatably supported on said crankpin; a connecting rod connected between each piston and said journal; and mechanical coupling means connected between said journal and said rotary cylinder block for causing rotation of the journal about the eccentric crankpin in synchronism with the rotation of the block about its axis, each connecting rod being connected with said journal at a position which, with reference to a line passing through said axis and extending axially through the corresponding cylinder, is always displaced from said line in the direction of rotation of the block but closely approaches said line in one angular position of the journal.

2. In an assembly as set forth in claim 1, said mechanical coupling means comprising a plurality of crank arms each having two shafts with their axes offset by the same distance as the offset of the crankpin from the axis of the block and said two shafts being joined by an arm disposed transversely therebetween, one of the shafts of each crank arm being journaled in the block and the other shaft bieng journaled in the connecting-rod journal.

3. In an assembly as set forth in claim 1, said crankpin being secured to one plate, and the main shaft passing into the crankcase through a central opening in the other plate and being secured at its inner end to the block;

and stabilizing bearing means interposed between said crankpin and said shaft along the axis of the block.

4. In an assembly as set forth in claim 1, each plate having at least one annular groove in its surface facing the block; annular seal means in said grooves; and spring means urging said seal means against said block.

5. In an assembly as set forth in claim 4, liquid duct means into said grooves, said block having openings therethrough adjacent said seals and said openings communicating with said crankcase for circulating liquid lubricant therethrough; and said seal means having passages therethrough for communicating liquid between said duct means and said openings in the block.

6. A rotary fuel combustion engine comprising a stationary frame; a rotary block journaled for rotation about its axis in said frame and having a central cavity defining the crankcase of the engine, and said block having at least one cylinder bore in the block disposed radially of said axis; an eccentric crankpin in said crankcase and supported by said frame offset from said axis of the block; a piston in each cylinder bore; connecting-rod and journal means respectively connected with said pistons and journaled on said crankpin for translating the reciprocatory piston motion into rotary motion of the block; a source of fuel; intake means communicating said fuel from the source to a passage in the block; a fuel injector directed into each cylinder; fuel injection pump means connected from said passage to each of the injectors, said pump means each having an injection plunger extending into said crankcase; cam means in the crankcase contacting said plungers and have a lobe for actuating each plunger to inject fuel into the associated cylinder at the beginning of its power stroke cycle; and exhaust means for venting each cylinder at the end of the power stroke.

7. In an engine as set forth in claim 6, each fuel injection pump means having a calibrating chamber emptied by said injection plunger when actuated; a calibrating piston extending into said chamber and into said crankcase; second cam means in the crankcase and actuating said calibrating piston to fill the chamber; and throttle linkage means for adjusting the position of the second cam means with respect to the first-mentioned cam means to vary the stroke of said calibrating piston when actuated to thereby vary the amount of fuel required to fill the calibrating chamber.

8. In an engine as set forth in claim 6, each cylinder having intake ports and exhaust ports uncovered by the piston when approaching bottom dead center, the ports extending through the block and communicating with air-intake and exhaust manifold means supported by the frame; the exhaust manifold aligning with the exhaust ports for substantially 50° of block rotation both sides of bottom dead center and the intake manifold aligning with the intake ports from 20° before bottom dead center to substantially 70° past bottom dead center.

9. In an engine as set forth in claim 8, said ports opening on opposite sides of the block, and the cylinder being opened substantially directly through said ports for said 70° past bottom dead center; and blower means supplying air under pressure to said air-intake manifold.

10. In an engine as set forth in claim 6, fuel igniting plug means in each cylinder.

11. In an engine as set forth in claim 6, said intake means communicating said fuel between the source and the block comprising annular plate means supported by said frame and each having at least one annular groove facing the block; annular seal means in said grooves; resilient means for urging said seal means against said block to seal the engine crankcase, at least one of said grooves having a duct communicating with said source, and said block having openings communicating with said passage therein; and said seal means having apertures therethrough for conducting fuel between said duct and said openings in the block.

12. In an engine as set forth in claim 11, said seal means having an annular recess in the face thereof which contacts the block and said recess being filled with fuel from said openings.

13. In an engine as set forth in claim 11, the fuel passage in the block having bores into said crankcase for introducing fuel thereinto as a lubricant.

14. A rotary fuel combustion engine comprising a stationary frame; a rotary block journaled for rotation about its axis in said frame and having a central cavity defining the crankcase of the engine, and said block having at least one cylinder bore in the block disposed radially of said axis; an eccentric crankpin in said crankcase and supported by said frame offset from said axis of the block; a piston in each cylinder bore; connecting-rod and journal means respectively connected with said pistons and journaled on said crankpin for translating the reciprocatory piston motion into rotary motion of the block; a source of fuel; intake means communicating said fuel from the source into the block; jacket means in the block adjacent the cylinder bores and receiving said fuel; fuel return means for continuously returning a portion of said fuel to said source; a fuel injector directed into each cylinder; fuel injection pump means connected between a jacket and each injector, said pump means each having an injection plunger extending into said crankcase; cam means in the crankcase contacting said plungers and having a lobe for actuating each plunger to inject fuel into the associated cylinder at the beginning of its power stroke cycle; and exhaust means for venting each cylinder at the end of the power stroke.

15. In an engine as set forth in claim 14, each fuel injection pump means having a calibrating chamber emptied by said injection plunger when actuated; a calibrating piston extending into said chamber and into said crankcase; second cam means in the crankcase and actuating said calibrating piston to fill the chamber; and throttle linkage means for adjusting the position of the second cam means with respect to the first-mentioned cam means to vary the stroke of said calibrating piston when actuated to thereby vary the amount of fuel required to fill the calibrating chamber.

16. In an engine as set forth in claim 14, each cylinder having intake ports and exhaust ports uncovered by the piston when approaching bottom dead center, the ports extending through the block and communicating with air-intake and exhaust manifold means supported by the frame; the exhaust manifold aligning with the exhaust ports for substantially 50° of block rotation both sides of bottom dead center and the intake manifold aligning with the intake ports from 20° before bottom dead center to substantially 70° past bottom dead center.

17. In an engine as set forth in claim 16, said ports opening on opposite sides of the block, and the cylinder being opened substantially directly through said ports for said 70° past bottom dead center; and blower means supplying air under pressure to said air-intake manifold.

18. In an engine as set forth in claim 14, said intake means and fuel return means communicating said fuel between the source and the block comprising annular plate means supported by said frame and each having at least one annular groove facing the block; annular seal means in said grooves; resilient means for urging said seal means against said block to seal the engine crankcase, at least two of said grooves having ducts communicating with said source to supply and return said fuel, and said block having openings communicating with said jacket means therein; and said seal means having apertures therethrough for conducting fuel between said ducts and said openings in the block.

19. In an engine as set forth in claim 18, said seal means having an annular recess in the face thereof which contacts the block and said recess being filled with fuel from said openings.

20. In an engine as set forth in claim 14, said source of fuel including heat-sink means for dissipating the heat from said engine jacket means.

21. In an engine as set forth in claim 14, said jacket means comprising at least two jackets respectively connected with said fuel intake means and said fuel return means, and said jackets having bores entering and leaving said crankcase for circulating fuel therethrough as a lubricant.

References Cited in the file of this patent
UNITED STATES PATENTS

| | | |
|---|---|---|
| 342,721 | Wood | May 25, 1886 |
| 1,315,822 | Doran | Sept. 9, 1919 |
| 1,602,018 | Harvey | Oct. 5, 1926 |
| 1,802,619 | Ramsey | Apr. 28, 1931 |
| 2,679,412 | Whitfield | May 25, 1954 |